July 22, 1969  D. D. ALLEN ET AL  3,456,748
AUTOMATIC ANIMAL FEED METERING APPARATUS
Filed Sept. 29, 1966
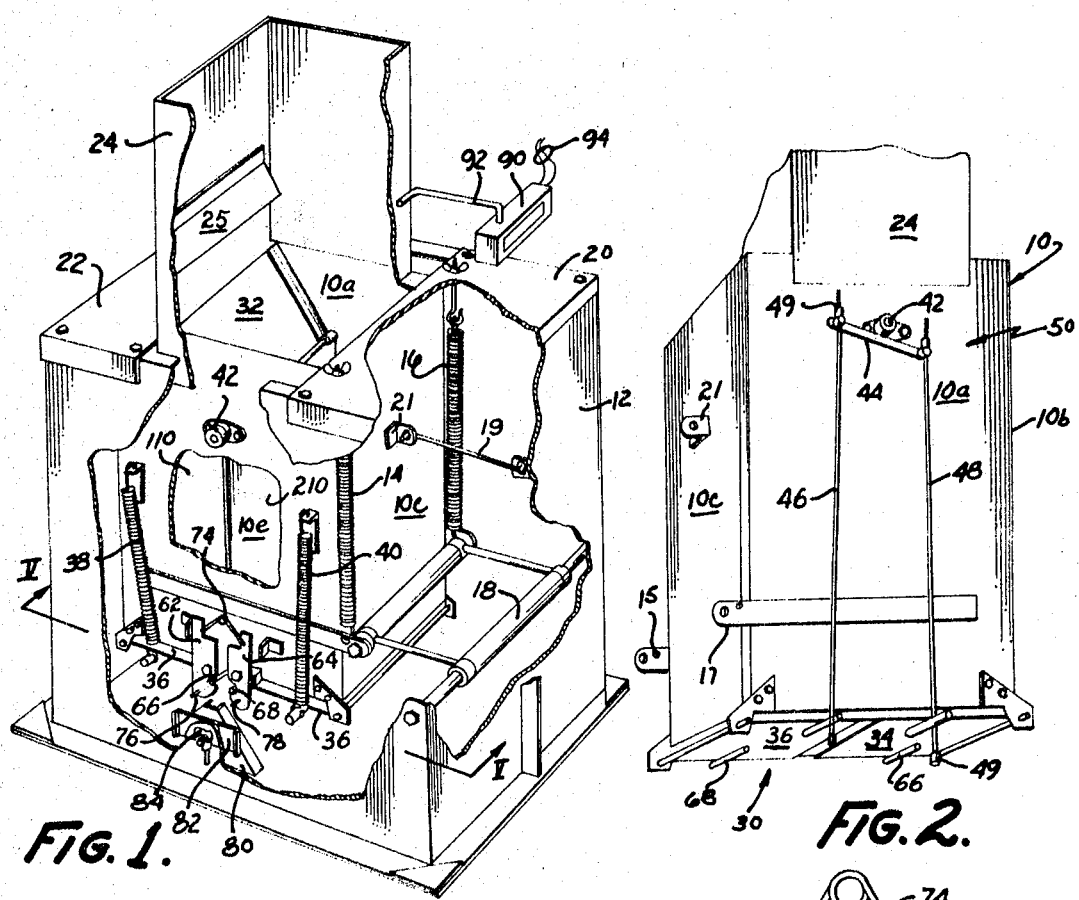
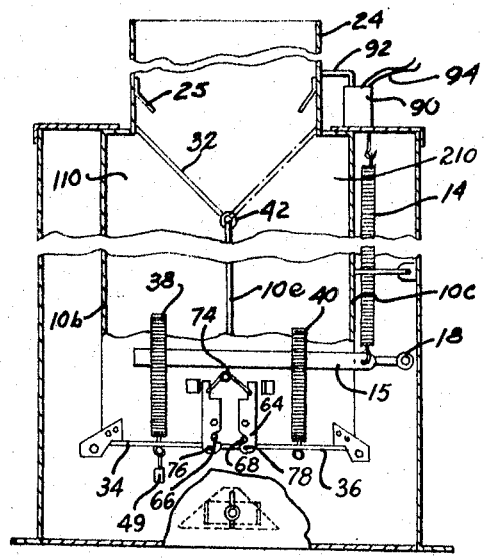
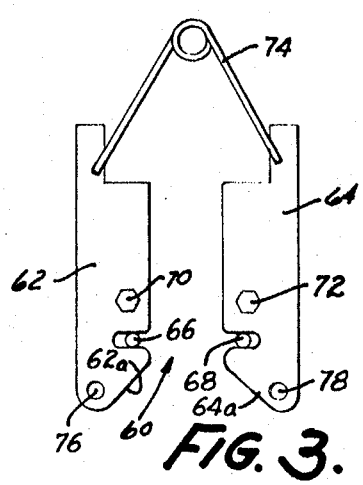
INVENTORS
DEE DEXTER ALLEN
ROBERT O. GEORGE
BY
ATTORNEYS

United States Patent Office 3,456,748
Patented July 22, 1969

---

3,456,748
AUTOMATIC ANIMAL FEED METERING APPARATUS
Dee Dexter Allen, Zeeland, and Robert O. George, Holland, Mich., assignors, by mesne assignments, to U.S. Industries, Inc., New York, N.Y., a corporation of Delaware
Filed Sept. 29, 1966, Ser. No. 582,964
Int. Cl. G01g 13/22
U.S. Cl. 177—92          23 Claims

ABSTRACT OF THE DISCLOSURE

A hopper-like enclosure divided to form a pair of feed receptacles, each having an inlet and an outlet, and controllable gate means for blocking the outlets to normally prevent discharge of feed therefrom, and for unblocking either outlet to permit such discharge when the receptacle involved contains a predetermined amount of feed, while simultaneously continuing to block the other such outlet.

---

This invention relates to animal feeding equipment, and more particularly to an apparatus for automatically and continuously metering the quantity of animal feed supplied from a source thereof by a conveyor mechanism or the like.

In the raising of domestic animals and poultry, a very considerable amount of equipment is presently available for feeding such animals or birds in a generally automated manner. For example, feed may be stored in a large, centrally-located hopper and automatically transferred from the topper to various feeding stations, through the use of remotely-controllable conveyor devices. While such devices can be operated in conjunction with a timer so that they run only for selected periods of time to provide a way of roughly gauging the amount of feed supplied to a particular feeding area, it is very often desirable to know with much more centainty than this just how much feed certain animals are consuming, or stated another way, to be able to give certain animals or groups of animals measured quantities of feed at particular times, so that the different diet programs used today may be successfully carried out.

Other than the aforesaid timer-controlled conveyor devices, very little equipment has heretofore been available for metering feed in the desired manner. Hoppers have been devised in the past which combined more-or-less conventional weighing scales such that the hopper assembly would weigh feed deposited therein, and some of these hopper assemblies were arranged to dump the quantity of feed in th hopper which had been weighed. However, such devices do not readily lend themselves to the feeding situation outlined above, since they do not provide continuous operation. That is, the feed-conveying mechanism must be stopped during the time the hopper is dumping or discharging its feed, and then must be restarted when the dumping is completed. Not only is this a tedious and time-consuming process, but the measuring function provided thereby is not sufficiently accurate to satisfy most existing needs.

Accordingly, it is a major object of the present invention to provide an apparatus for continuously metering animal feed from a supply thereof, and for continuously metering in accurate, predetermined quantities.

A further important object of the invention is to provide apparatus of the aforesaid nature having first and second feed receptacles, each with an inlet for receiving feed and each with an outlet for discharging feed from that receptacle, and further having means for coordinating the filling and discharging of feed from the said receptacles such that the same occurs in an alternating manner, with a steady succession of alternating filling and dumping which provides a continuous metering action.

A still further important object of the invention is to provide a new form of hopper construction having enclosing walls and partition walls forming first and second feed receptacles within a single hopper enclosure, upon which is supported various control and coordinating means providing alternating filling and dumping of the said receptacles.

Another major object of the invention is to provide apparatus of the character described which further includes means for automatically counting the filling and dumping cycles of the feed receptacles, to thereby provide an accurate indication of the total amount of feed which has been metered at any given time, and also by which an output signal may be obtained for controlling the supply conveyor when a desired quantity of feed has been metered.

The foregoing major objects of the invention and the advantages provided thereby, together with other objects and advantages equally a part thereof, will become increasingly apparent following consideration of the ensuing specification and its appended claims, particularly when taken in conjunction with the accompanying illustrative drawings setting forth a preferred embodiment of the invention.

In the drawings:

FIG. 1 is a fragmentary, frontal perspective view of the novel apparatus, with portions of the figure being broken away to reveal details;

FIG. 2 is a reduced rearward perspective view of the structure shown in FIG. 1;

FIG. 3 is an enlarged elevation showing details of a portion of the structure seen in FIG. 2; and FIG. 4 is a sectional elevation taken through the plane IV—IV of FIG. 1.

Briefly stated, the present invention basically provides an apparatus for continuously metering animal feed from a supply thereof, which apparatus includes first and second feed receptacles, each having an inlet portion arranged to receive feed from the supply and an outlet portion for discharging feed from that receptacle, a controllable gate means for blocking the said receptacle outlets to normally prevent the discharge of feed therefrom and for unblocking either of said outlets so that feed may then be discharged therefrom, a latching means for holding the said gate means in a blocking condition until unlatched, a means for monitoring the amount of feed in said receptacles and for unlatching said latching means to provide unblocking of the outlet of either of said receptacles when it contains a predetermined quantity of feed to thereby discharge such feed, and a coordinating mechanism coupled to and coacting with said gate means for providing alternating blocking and unblocking operation thereof, such that only one of said receptacle outlets discharges feed at any given time. The receptacles thus alternatingly charge and discharge measured quantities of feed, and by so doing they continuously meter the aforesaid supply thereof by a succession of discrete known quantities.

Referring now in more detail to the drawings, the invention includes what may be described as a hopper 10 mounted within a supporting housing 12 (FIG. 2) by means of a pair of suspending springs 14 and 16 and an arm-balance structure 18, together with a pivoting linkage arm 19. The springs 14 and 16 and arm balance 18 provide a spring-balanced suspension system which is calibrated to the weight of feed present within the hopper 10; that is, the springs are selected so that the hopper will have a known downward vertical movement relative to the housing 12 in response to a given amount of weight present within the hopper or placed thereupon. The arm balance 18 is pivotally connected between one side wall of the housing 12 and a pair of straps 15 and 17 attached to opposite sides 10a and 10d of the hopper 10. The linkage arm 19 has hooked or offset ends which extend through apertures in a wall of the housing 12 and in a bracket 21 attached to side 10c of the hopper. Both the balance arm 18 and the pivot link 19 pivot to stabilize the hopper during its vertical excursions. The arm balance also operates to hold the hopper steady against twisting movements within the housing 12 which might otherwise occur.

The housing 12 is in essence merely a generally rigid hollow enclosure structure serving to both house and support the hopper 10 and its associated structures. The housing 12 defines a central opening in its top portion, as for example between a pair of upper cover plates 20 and 22, and an upstanding rectangular extension 24 of the hopper 10 extends vertically through the said opening in the top of the housing and between the cover plates. The upper extension 24 of the hopper forms an inlet structure, by which the hopper may be coupled to a supply of animal feed, such as a feeder conveyor. As will be apparent, such a coupling may be accomplished, for example, by the conventional expedient of locating the inlet structure 24 beneath a feeder trough having an opening in the bottom thereof through which feed may drop directly into the inlet structure 24, and thus into the hopper 10.

The hopper 10 is a box-like structure having enclosing side walls 10a, 10b, 10c, and 10d, having the upstanding inlet structure 24 just noted, and also having a controlable gate means 30 at the bottom thereof. The hopper 10 has a vertically-oriented inner partition 10e (FIG. 1) which divides it into a pair of compartments 110 and 210 comprising first and second feed receptacles. Separate inlet openings for each of these compartments or feed receptacles are provided by a shiftable or movable vane 32 which is pivotally mounted near the top of the hopper, immediately above and in alignment with the dividing partition 10e and between the walls 10a and 10d. The vane 32 is a generally vertically-oriented panel extending substantially completely across the inside of the inlet structure 24. It is pivotally mounted at its bottom so that its top may be shifted or swept from one side of the inlet structure 24 to the other thereof, such that the vane directs feed entering the top of the inlet structure 24 into one or the other of the inlet portions for the compartments or feed receptacles 110 and 210, to provide selective filling thereof. Downwardly and inwardly inclined shielding flanges 25 (FIG. 1) are preferably provided on opposite sides of the inlet structure 24 such that they extend over the top of the shiftable vane 32 when it lies against such sides. These flanges prevent incoming feed from falling or working its way between the top of the vane and the adjacent inlet wall and entering the feed receptacle then being closed by the vane.

The vertical partition 10e within the hopper 10 extends completely to the bottom thereof, so that the compartments or feed receptacles 110 and 210 formed by the partition are mutually separate all the way from the bottom of the shiftable vane 32 down to the gate means 30 at the bottom of the hopper. The said gate means includes a pair of pivotally mounted shutters 34 and 36 which normally are held in a closed position by tension springs 38 and 40, respectively, extending between the shutters and a wall of the hopper. In this position, the shutters 34 and 36 close the outlet openings of the two compartments or feed receptacles formed by the partition 10e. The springs 38 and 40 should be selected so that they will hold the gate shutters 34 and 36 closed when their respective compartments or receptacles are either empty or contain a small amount of feed. However, these springs should resiliently yield when feed exceeding a predetermined percentage of a full compartment is present therein so that, ignoring other factors, the shutters will swing open when such a weight is applied thereto from within the compartments, to thereby unblock the compartment outlets and permit the feed within one or the other thereof to be discharged.

It is to be noted that, as best seen in FIG. 2, a connecting structure is provided between the gate shutters 34 and 36 and the shiftable vane 32 near the top of the hopper. That is, the vane 32 is pivotally mounted by a cylindrical rod 42 or the like, to which it is fixedly attached at its bottom. This rod is journalled in opposite side walls of the hopper. A cross arm 44 is secured to the protruding end of said pivot rod 42 adjacent the outer side of wall 10a, such that the ends of the cross arm are swung upwardly or downwardly around rod 42 each time the vane 32 is swung from one side of the inlet structure 24 to the other.

A pair of control links 46 and 48 are slidably coupled to the end extremities of the cross arm 44, preferably by extending through an apertured rod element which is pivotally attached to the ends of the cross arm, such that the control links 46 and 48 may remain substantially vertical and "follow" the rocking movements of the cross arm. The control links 46 and 48 extend downwardly from the cross arm 44 and each passes through an apertured rod element which is pivotally attached to one of the gate shutters 34 and 36. Stop elements 49 such as collars with set screws therein are attached to each end of the control links, so that each gate shutter is effectively connected by a tension member (i.e., one of the control links) to the cross arm 44.

From the foregoing description, it will be apparent that when one or the other of the gate shutters is forced open by the presence of feed contained within the feed receptacle whose outlet is closed by that shutter, the control link attached to that shutter will be pulled downward, thereby pivoting the cross arm 44 about the pivot rod 42 and swinging the shiftable vane 42 which is mounted on pivot rod 42 from one side of the inlet structure 24 to the other thereof. This will, of course, serve to direct feed entering the inlet structure into the particular compartment or feed receptacle 110 or 210 whose gate shutter remains closed or blocked. Thus, what may be termed a "coordinating mechanism" 50 is defined by the pivotally mounted vane 32, the cross arm 44 connected thereto for pivoting the vane, the control links 46 and 48 and the structure connecting these links to the cross arm 44, and the weight-responsive springs 38 and 40 which control the opening of the gate shutters 34 and 36, respectively. This "coordinating mechanism" may be said to coact with the gate means 30 including the shutters 34 and 36 to provide alternating blocking and unblocking operation thereof, such that the outlet of only one of the feed receptacles discharges feed at any given time, and such that the said receptacles alternatingly fill and discharge feed. Actually, the vane 32, its pivot rod 42, the cross arm 44 connected to the latter, and the control links 46 and 48 might, in, and of themselves, be referred to as comprising a "coordinator means," since these elements control the opening and closing of the inlets to the respective feed compartments 110 and 210 in response to the operation of the gate means, in the manner which has been stated above. Similarly, the term "gate means" is intended to mean the gate shutters 34 and 36, whereas the term "gate structure" is intended to embrace not only the shutters 34 and 36, but the springs 38 and 40 which bias these shutters toward a closed position.

As seen in FIGS. 1 and 3, latching means 60 are provided by which the shutters 34 and 36 of the gate means 30 are held in a position blocking the outlets of the feed receptacles within the hopper 10 until such time as the latching means are unlatched. The latching means or mechanism 60 comprises a pair of latch elements 62 and 64 which are pivotally mounted upon the hopper 10 at the lower portion of one side thereof, and catch pins 66 and 68 secured to the gate shutters 34 and 36, respectively, (note FIG. 2) and protruding outwardly therefrom, so as to be engageable within an appropriate recess or notch formed near the bottom of each of the latch elements 62 and 64 (FIG. 3). The latch elements are pivotally attached to the hopper 10 by a pair of bolts 70 and 72, and the two latch elements have a torsion spring 74 mounted between their upward extremities, to bias the upward extremities outwardly and thereby urge the lower extremities inwardly, toward each other, to thereby maintain the engagement of the catch pins 66 and 68 within their respective notches at the lower extremities of the latch elements. It will be noted that the bottom extremity of each latch element 62 and 64 is smoothly rounded and bevelled upwardly at 62a and 64a, respectively, at the inside bottom edge of the elements. Further, an outwardly-projecting rounded pin 76 and 78, respectively, (FIGS. 1 and 3) is secured to each of the latch elements, at the bottom extremity thereof.

The outwardly protruding rounded pins 76 and 78 just noted provide cam follower elements, by which the latch elements 62 and 64 may be actuated between latching and unlatching positions, i.e., positions in which the catch pins 66 and 68 are engaged and disengaged, respectively, within the notches in the latch elements. A cam element 80 (FIG. 1) is provided for cooperating operation with the aforesaid cam follower pins 76 and 78. The cam element 80 is a triangularly shaped member which is secured to an inside wall of the support housing 12, as by a threaded projection or bolt secured to the cam element which extends through a slot in the said side of the housing 12, with a backing plate 82 provided for bearing against the inside surface of the hopper wall and a wing nut 84 which is engageable with the said bolt or threaded projection and which is located on the outside of the housing wall to bear against it when tightened to secure the cam 80 in place.

The lateral sides of the triangularly shaped cam element 80 form cam surfaces upon which ride the cam follower pins 76 and 78 secured to the bottom extremities of the two latch elements 62 and 64, with the result that as the hopper 10 moves downward in response to the increasing weight of feed placed in one or the other of the compartments or receptacles 110 and 210, the cam follower pins 76 and 78 are moved downwardly on the aforesaid cam surfaces, thereby steadily being forced outwardly. This moves the bottom extremities of the latch elements 62 and 64 outwardly or apart against the bias provided by the torsion spring 74 between the tops of these two latch elements, until the latch elements are moved apart sufficiently to free or disengage the two catch pins 66 and 68 attached to the gate shutters 34 and 36. The torsion spring 74 continues to bias the bottoms of the latch elements 62 and 64 toward each other, however, so that whenever the hopper 10 is above the cam element 80, the latch elements will always occupy the position shown in FIGS. 1 and 3. Thus, if there is nothing to offset the upward force exerted by the two springs 38 and 40 secured to the gate shutters 34 and 36, these springs will urge the shutters upwardly into a closed position in which they will be latched by the elements 62 and 64. That is, the catch pins 66 and 68 attached to the gate shutters will move up the bevelled surfaces 62a and 64a of the respective latch elements under the force of the springs 38 and 40, which tends to close the shutters 34 and 36, until the catch pins have moved the latch elements apart enough to allow the catch pins to engage the notches formed in the latch elements. It will be clear, therefore, that the springs 38 and 40 which urge the gate shutters upward must be at least slightly stronger than the torsion spring 74 urging the latch elements together, so that the catch pins 66 and 68 can move the bottoms of the latch elements apart slightly as the pins move up the angularly bevelled surfaces 62a and 64a to become engaged in the aforesaid notches.

It will be observed (FIG. 1) that a mechanical counter 90 may be mounted to the housing and support 12 and connected to the inlet structure 24, as by an arm 92, such that each vertical movement of the hopper 10, as reflected through corresponding movement of the inlet structure 24, will register a count on the counter 90. As will be quite apparent to those skilled in the art, the counter 90 may be of a conventional type readily available from commercial sources. Further, the counter may be of the type having a "preset" feature, by which a desired count may be preset on the counter and when a count has been registered on the counter which equals the preset number, electrical contacts within the counter will provide a closed circuit through a pair of conductors 94, by which an electrical signal may be provided, for purposes to be seen subsequently.

The arrangement of the weight-responsive suspension springs 14 and 16 and the balance arm 18 acting therewith, together with the cam 80 and the cam follower pins 76 and 78 cooperating therewith, serves to provide what may be referred to as a means for monitoring the amount of feed in the compartments or receptacles 110 and 210, which will act to unlatch the latching means 60 to provide unblocking of the said receptacles whenever either receptacles contains a predetermined quantity of feed. That is, as previously stated, the springs 14 and 16 are chosen to provide a given downward excursion of the hopper 10 whenever either of the compartments 110 or 210 therewithin contains a predetermined amount of feed. During such downward movement, the cam follower pins 76 and 78 move downward on the edges of the cam 80, and the cam may be adjusted by manipulation of the wing nut 84 such that the unlatching of the catch pins 66 and 68 attached to the gate shutters 34 and 36 occurs whenever a desired amount of feed is present within one or the other of the compartments.

Operation

In operation, feed is supplied to the inlet structure 24, preferably in a continuous manner, and drops downwardly therein into one or the other of the compartments 110 and 210, as determined by the position of the pivotally mounted vane 32. The flanges or aprons 25 at each side of the inlet structure 24 shield the upper edge of vane 32, so that entering feed falls against the lower portion of the vane only, and cannot pass over the top edge of the vane and into the compartment which is being closed thereby. Thus, the incoming feed can enter only one of the compartments or receptacles, in which it falls to the bottom and is retained by the presence of the gate shutter 34 or 36 at the bottom of that particular feed receptacle.

The gate shutters 34 and 36 held in a closed position initially by the two springs 38 and 40, and the gates are latched closed by means of the latching mechanism 60. Consequently, the feed builds up in the said one receptacle, and this causes the entire hopper to slowly move downwardly within its housing and support 12, due to the elastic deflection of the suspension springs 14 and 16.

When the downward movement of the hopper 10 has reached a preselected point corresponding to a chosen weight of feed within the particular receptacle being filled, the latching means 60 is actuated by the cam 80 and one of the cam follower pins 76 and 78, so that both of the gate shutters 34 and 36 are unlatched. The shutter closing the receptacle having the quantity of feed therein has this feed applied directly on the upper surfaces of the shutter, and the weight of this feed immediately opens such shutter against the tension of spring 38 or 40, to discharge the feed out the bottom of the receptacle. However, the springs 38 and 40 are chosen so that more than a predetermined minimum amount of feed must be placed upon the top of the gate shutters in order to overcome the force exerted by the springs tending to close the said shutters. Consequently, while both shutters are actually unlatched at the same time, only the one closing the filled compartment is actually opened.

Discharge of the feed from this receptacle is immediate, and as soon as this discharge or dumping of feed is completed, several things happen. First of all, since the weight of feed within the hopper is suddenly removed, the hopper is brought sharply back up to its original position by the suspension springs 14 and 16. Also, the opened gate shutter is brought sharply back to a closed position by the spring 38 or 40 attached to that shutter. Further, whenever a particular gate shutter is opened by the weight of feed pressing thereupon, it pulls downwardly on one or the other of the control links 46 and 48 (FIG. 2), thereby pivoting the cross arm 44 attached to the pivot pin 42 mounting the vane 32 within the top of the inlet structure 24. This immediately shifts the said vane to the opposite side of the inlet structure 24, thereby directing feed into the second feed receptacle at the very instant that dumping of the first receptacle takes place. As has been stated, both of the gate shutters are unlatched at this moment, but since the springs 38 and 40 require more than a minimum amount of feed to be present within a receptacle in order to force its shutter open, the feed directed into the previously empty second receptacle during dumping of the first is less than this minimum, and consequently only the shutter of the first filled receptacle is opened, even though both shutters are actually unlatched. As stated, the dumping of the filled receptacle is immediate, and consequently the hopper has moved back up to its original position wherein the gate shutters are latched closed long before the second compartment or receptacle is filled to the point where the spring 38 or 40 attached thereto might be overcome.

As will be apparent, the above-described upward and downward, latching and unlatching type of operation continues indefinitely, with each downward excursion of the hopper 10 being marked by a dumping of an accurately measured weight of feed from the bottom of the hopper, accompanied by the shifting of the vane 32 so that the opposite feed receptacle then begins to be filled. As the hopper 10 moves downward to weight and dump each new quantity of feed, the mechanical counter 90 is actuated through its connecting arm 92, so that each new count is registered on the face of the counter. Since each quantity of feed dumped corresponds very closely to a preselected weight, the count indicated on the counter is quickly translatable into a total measured quantity of feed which has been metered. When the preferred electrical switching type of counter is used, a desired number of counts may be perset into the counter, and the conductors 94 connected into the energizing circuit for the feed conveyor or the like supplying the feed to the inlet structure of the invention. Consequently, when the preset quantity has been metered out, the switching action of the counter will automatically terminate the operation of the feed conveyor, thereby stopping the entire metering operation.

It is believed that those skilled in the pertinent arts will immediately recognize that the present apparatus provides a novel and desirable means for continuously metering known quantities of animal feed from a supply thereof by a unique mechanism which is relatively simple to manufacture and yet which provides very accurate metering over prolonged periods of operation. The device is sturdy and not subject to mechanical wear or breakdown, and the quantities of feed metered thereby may be adjusted over a desired range, as by changing the vertical position of the cam 80 so that unlatching of the gate shutters 34 and 36 takes place at any desired point in the downward movement of the hopper caused by the increasing weight of feed being directed into one or the other of the feed receptacles therewithin.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concept of the invention and clearly incorporate the spirit thereof are to be considered as within the scope of the invention.

We claim:

1. Apparatus for continuously metering animal feed from a supply thereof, comprising in combination: first and second feed receptacles, each having an inlet portion arranged to receive feed from said supply and each having an outlet portion for discharging feed from that receptacle; an independently controllable gate means for each of said outlets to normally block each outlet and prevent the discharge of feed therefrom, and for unblocking either outlet so that feed may be discharged therefrom; releasable means for holding said gate means in a blocking condition until released; means for releasing said releasable means to provide unblocking of the outlet of either of said receptacles when it contains a predetermined quantity of feed, to thereby discharge such feed; and a coordinating mechanism coupled to and co-acting with said gate means for providing alternating blocking and unblocking operation thereof, such that only one of said receptacle outlets discharges feed at any given time; said receptacles thereby alternatingly discharging feed to continuously meter said supply by a succession of discrete known quantities.

2. The apparatus defined in claim 1, wherein said coordinating mechanism includes means for directing feed from said supply into the inlet portion of one or the other of said receptacles at any given time, to provide selective filling thereof.

3. The apparatus defined in claim 2, wherein said coordinating mechanism further includes a control link connected to said feed-directing means for controlling the latter in response to the operation of said gate means, such that when the outlet of one of said receptacles is unblocked to discharge feed, from said supply is directed into the inlet portion of the other such receptacle, whose outlet is then blocked.

4. The apparatus defined in claim 3, wherein said coordinating mechanism further includes structure for holding said gate means in a blocking position until at least a predetermined minimum amount of feed has entered one of said receptacles, and then releasing the gate means at the outlet of the receptacle containing said amount of feed while continuing to hold the gate means at the outlet of the other such receptacle in its blocking position.

5. The apparatus defined in claim 4, wherein said structure for holding and releasing said gate means comprises at least one resilient biasing member.

6. The apparatus defined in claim 1, wherein means is provided for mounting each of the receptacles such that each undergoes movement in response to the weight of the feed which it contains.

7. The apparatus defined in claim 6, wherein said releasable means includes cooperating cam and cam followerelements arranged to undergo relative camming motion during the said movement of either of said receptacles, said elements causing releasing of said releasable means at a predetermined point in said receptacle movement representing a predetermined measured weight of feed contained within either receptacle.

8. The apparatus defined in claim 7, wherein said receptacles and gate means are arranged such that the weight of feed within the receptacles is applied to the gate means and wherein said coordinating mechanism includes structure for holding the released gate means in a blocking position until at least a predetermined minimum weight of feed is contained in at least one of said receptacles and applied to the gate means at the outlet thereof, and for then releasing such gate means to an unblocking position to discharge the feed whose weight is applied thereto, whereby the gate means of both said receptacles is released whenever either receptacle contains the desired measured weight of feed but only unblocks the outlet of the receptacle containing said measured weight.

9. The apparatus defined in claim 8, wherein said coordinating mechanism includes means for directing feed from said supply into the inlet portion of one or the other of said receptacles at any given time, to provide selective feeding thereof, and wherein said coordinating mechanism further includes a control link connected to said feed-directing means for controlling the latter in response to the unblocking operation of said gate means, such that when the outlet of one of said receptacles is unblocked to discharge feed, feed from said supply is directed into the inlet portion of the other such receptacle, whose outlet is then blocked.

10. The apparatus defined in claim 1, further including means connected to at least one of said receptacles for counting the number of times feed has been discharged therefrom, whereby the total amount of discharged feed may be known.

11. The apparatus defined in claim 10, wherein said means for counting is of the type providing an electrical switching function at a preselected discharge count, whereby the supply of feed to the apparatus may be controlled.

12. Apparatus of claim 1 including shut-off means for monitoring the number of times said gate means unblock said discharge openings and for interrupting said feed supply when a predetermined such number of times has occurred.

13. Apparatus for metering a continuous supply of animal feed, comprising in combination: a hopper having enclosing side walls; a vertically oriented partition in said hopper dividing it into at least two compartments, each having an inlet at the top for receiving feed from said supply and each having an outlet at its bottom for discharging feed; means shiftably mounted above said inlets for directing feed from said supply into a selected one of the inlets; a gate structure having portions mounted for movement beneath each of said outlets, for opening and closing either thereof; a latch mechanism for normally holding said gate structure portions in a position closing both of said outlets but being actuable to unlatch the said portions so that the same may be opened; means for actuating said latch mechanism to unlatch said gate structure portions when a predetermined weight of feed has been directed into either of said compartments; said gate structure arranged to open the said portions thereof closing the outlet of the compartment containing said predetermined weight of feed to discharge such feed while maintaining the portions closing the outlet of the other such compartment in a closed condition; and a coordinator means coupled to said gate structure and having a control link connected to said feed-directing means for shifting the same in response to the opening of said gate structure portions such that feed from said supply is directed into the compartment whose outlet remains closed, such that said supply is continuously directed into one or the other of said compartments, which alternatingly discharge measured amounts of feed to continuously meter said supply.

14. The apparatus defined in claim 13, wherein said gate structure portions are a pair of shutters, each positioned across the bottom of said hopper to separately control the outlet of each of said compartments.

15. The apparatus defined in claim 14, wherein said gate structure includes a resilient biasing member connected to each of said shutters to hold the same closed until a predetermined weight of feed is applied to either such shutter and to then resiliently yield to allow such weight to open such shutter.

16. The apparatus defined in claim 13, wherein said shiftably mounted means for directing feed comprises a vane pivotally secured to the top of said hopper directly above said compartments.

17. The apparatus defined in claim 13, wherein said structure is provided for mounting said hopper such that it is moved downwardly in response to the weight of the feed in either of said compartments.

18. The apparatus defined in claim 17, wherein said latch mechanism defines cooperating cam and cam follower elements arranged to undergo relative camming motion during the said downward hopper movement and to actuate said latch mechanism to cause unlatching of said gate structure portions at a predetermined point in said downward movement representing the presence of such predetermined weight of feed in one of said compartments.

19. The apparatus defined in claim 18, wherein said gate structure portions are a pair of shutters, each positioned across the bottom of said hopper to separately control the outlet of each of said compartments.

20. The apparatus defined in claim 19, wherein said gate structure includes a resilient biasing member connected between said hopper and each of said shutters to hold the same closed until a predetermined weight of feed is applied to either such shutter and to then resiliently yield to allow such weight to open such shutter.

21. The apparatus defined in claim 20, wherein said shiftably mounted means for directing feed comprises a vane pivotally secured to the top of said hopper directly above said compartments.

22. The apparatus defined in claim 21, wherein said latch mechanism includes a catch pin member fixed to each of said gate structure shutters and at least one latch element mounted on said hopper to move from a first position in which said catch pins are engaged to a second position in which the catch pins are disengaged, and wherein said cam element is fixed relative to said hopper and said cam follower elements are connected to said latch element, such that downward movement of the hopper moves said cam element downwardly therewith to slide said cam follower elements upon said cam and thereby move said element from said first to said second position.

23. The apparatus defined in claim 22, wherein said structure for mounting said hopper for downward movement in response to the weight of feed comprises a spring-balanced suspension system calibrated to the weight of the feed present in said hopper compartments.

References Cited

UNITED STATES PATENTS

| | | | |
|---|---|---|---|
| 980,114 | 12/1910 | McKeown et al. | 177—92 |
| 1,039,471 | 9/1912 | Adams | 177—92 |
| 3,110,351 | 11/1963 | Sealey | 177—92 |

FOREIGN PATENTS

| | | |
|---|---|---|
| 1,069,180 | 12/1965 | Great Britain. |

RICHARD B. WILKINSON, Primary Examiner

GEORGE H. MILLER, Assistant Examiner

U.S. Cl. X.R.

177—114